(12) United States Patent
Wurtz (10) Patent No.: US 9,887,525 B2
(45) Date of Patent: Feb. 6, 2018

(54) ELECTRICAL GANG BOX ASSEMBLY (71) Applicant: Jesse H. Wurtz, Gallatin, MO (US)

(72) Inventor: Jesse H. Wurtz, Gallatin, MO (US)

( * ) Notice: Subject to any disclaimer, the term of this patent is extended or adjusted under 35 U.S.C. 154(b) by 0 days.

(21) Appl. No.: 15/080,869

(22) Filed: Mar. 25, 2016

(65) Prior Publication Data

US 2017/0279257 A1 Sep. 28, 2017

(51) Int. Cl.
  *H02G 3/08* (2006.01)
  *H02G 3/10* (2006.01)
  *H02G 3/14* (2006.01)
  *H01R 24/76* (2011.01)

(52) U.S. Cl.
  CPC ............ *H02G 3/086* (2013.01); *H01R 24/76* (2013.01); *H02G 3/10* (2013.01); *H02G 3/14* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2,717,715 A | * | 9/1955 | Whelan ................ | H02G 3/086 220/3.7 |
| 4,872,849 A | * | 10/1989 | Long ................... | H01R 25/164 439/209 |
| 6,075,204 A | * | 6/2000 | Celauro ................ | A23L 3/003 174/17 GF |
| 7,208,679 B2 | * | 4/2007 | Phillips ................. | H02G 3/126 174/135 |

* cited by examiner

*Primary Examiner* — Dhirubhai R Patel
(74) *Attorney, Agent, or Firm* — Dennis L. Thomte; Thomte Patent Law Office LLC (57) ABSTRACT

An electrical box assembly which includes a horizontally extending support member having a horizontally disposed top wall, a vertically disposed back wall, and a horizontally disposed bottom wall. A front cover is secured to the forward ends of the top and bottom walls. The front cover has one or more electrical receptacle openings formed therein which have electrical receptacles mounted therein. A first side cover closes one end of the support member and a second side cover closes the other end of the support member.

1 Claim, 7 Drawing Sheets

ELECTRICAL GANG BOX ASSEMBLY

BACKGROUND OF THE INVENTION

Field of the Invention

This invention relates to an electrical box assembly and more particularly to an electrical gang box assembly which may be comprised of a single gang or several gangs. More particularly, this invention relates to an electrical gang box assembly which is easier to install than prior art electrical gang box assemblies.

Description of the Related Art

Electrical gang box assemblies have long been provided which include single receptacle boxes, two-gang boxes, three-gang boxes, etc. The electrical gang boxes of the prior art are not user friendly in that considerable time and effort is required to mount the box and to install electrical receptacles therein. Further, the prior art electrical gang boxes are not easily expanded to accommodate additional electrical receptacles. Additionally, the prior art electrical gang boxes do not provide the necessary structure to make the boxes dust proof, weather proof, etc.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An electrical box is disclosed for mounting on a support wall. The electrical box includes an elongated and horizontally disposed support member having a first end and a second end. The support member includes a horizontally extending and vertically disposed back wall having a first end, a second end, an upper end, a lower end, a front side and a back side. The back wall is configured to be secured to the support wall. The support member includes a horizontally disposed top wall having a first end, a second end, a rearward end and a forward end. The top wall extends horizontally forwardly from the upper end of the back wall. A vertically disposed upper flange extends downwardly from the forward end of the top wall. The support member also includes a horizontally disposed bottom wall having a first end, a second end, a rearward end, and a forward end. The bottom wall extends horizontally forwardly from the lower end of the back wall. A vertically disposed lower flange extends upwardly from the forward end of the bottom wall.

A vertically disposed front cover is provided which has a first end, a second end, an upper end and a lower end. The front cover has a plurality of horizontally spaced-apart receptacle openings formed therein which are configured to have an electrical receptacle positioned therein. The upper end of the front cover is secured to the upper flange of the top wall. The lower end of the front cover is secured to the lower flange of the bottom wall.

A first side cover is also provided which has a rearward end, a forward end, an upper end and a lower end with the first side cover being positioned at the first ends of the back wall, the top wall and the bottom wall. A second side cover is also provided which has a rearward end, a forward end, an upper end and a lower end with the second side cover being positioned at the second ends of the back wall, the top wall and the bottom wall.

In the preferred embodiment, a first back mount is secured to the back wall at the first end of the back wall and a second back mount is secured to the back wall at the second end of the back wall with the first and second back mounts being configured to be secured to the support wall. In the preferred embodiment, a horizontally disposed flange extends rearwardly from the upper end of the front cover over the forward end of the top wall.

It is therefore a principal object of the invention to provide an improved electrical gang box assembly.

A further object of the invention is to provide an electrical gang box assembly which may accommodate a plurality of electrical receptacles positioned in the front cover of the assembly in a horizontally spaced-apart manner.

A further object of the invention is to provide an electrical gang box assembly of the invention which is easy to install and easy to maintain.

A further object of the invention is to provide an electrical gang box assembly of the type described which takes less time to install than prior art devices.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
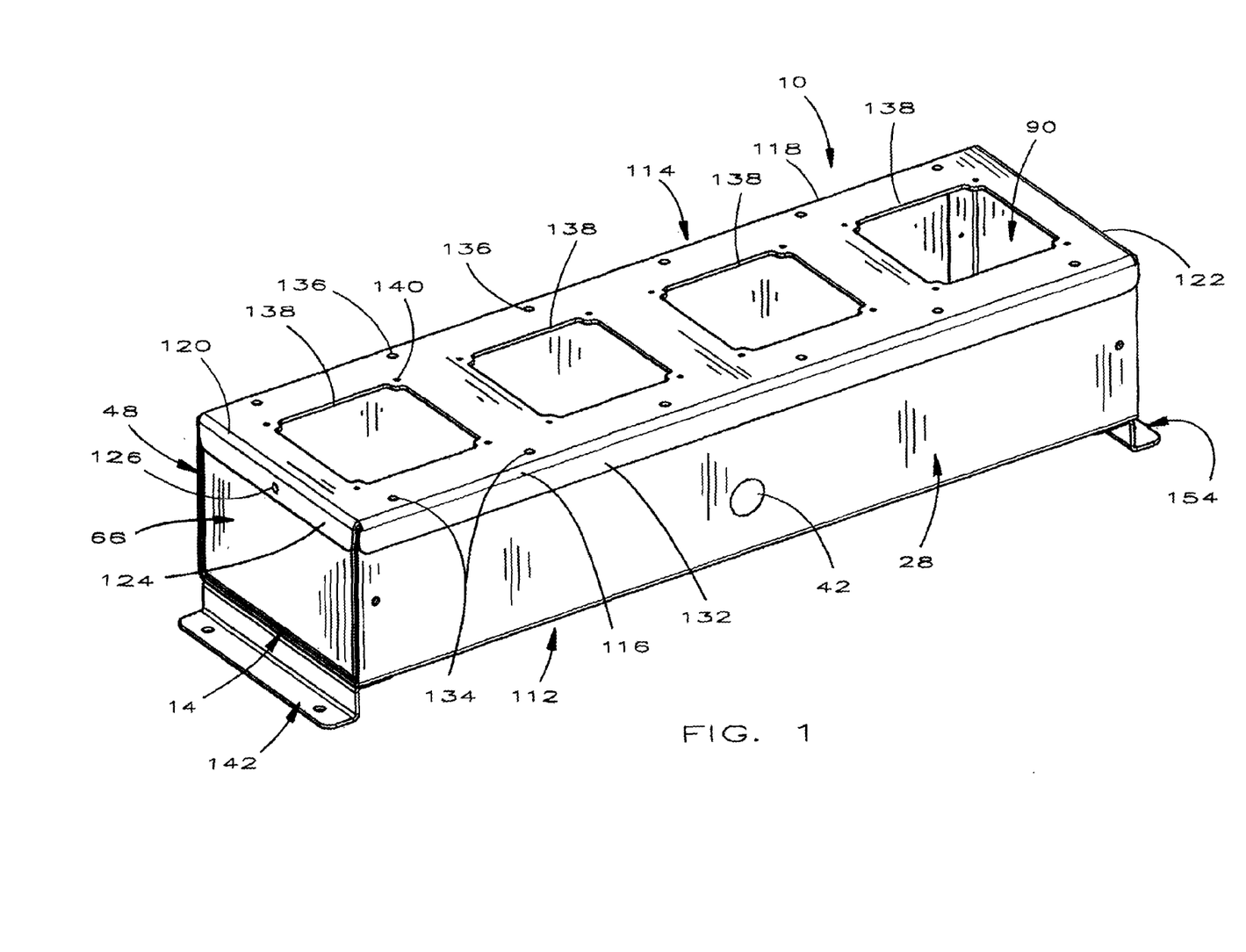
FIG. 1 is an upper perspective view of the electrical gang box assembly of this invention.
Figure 2:
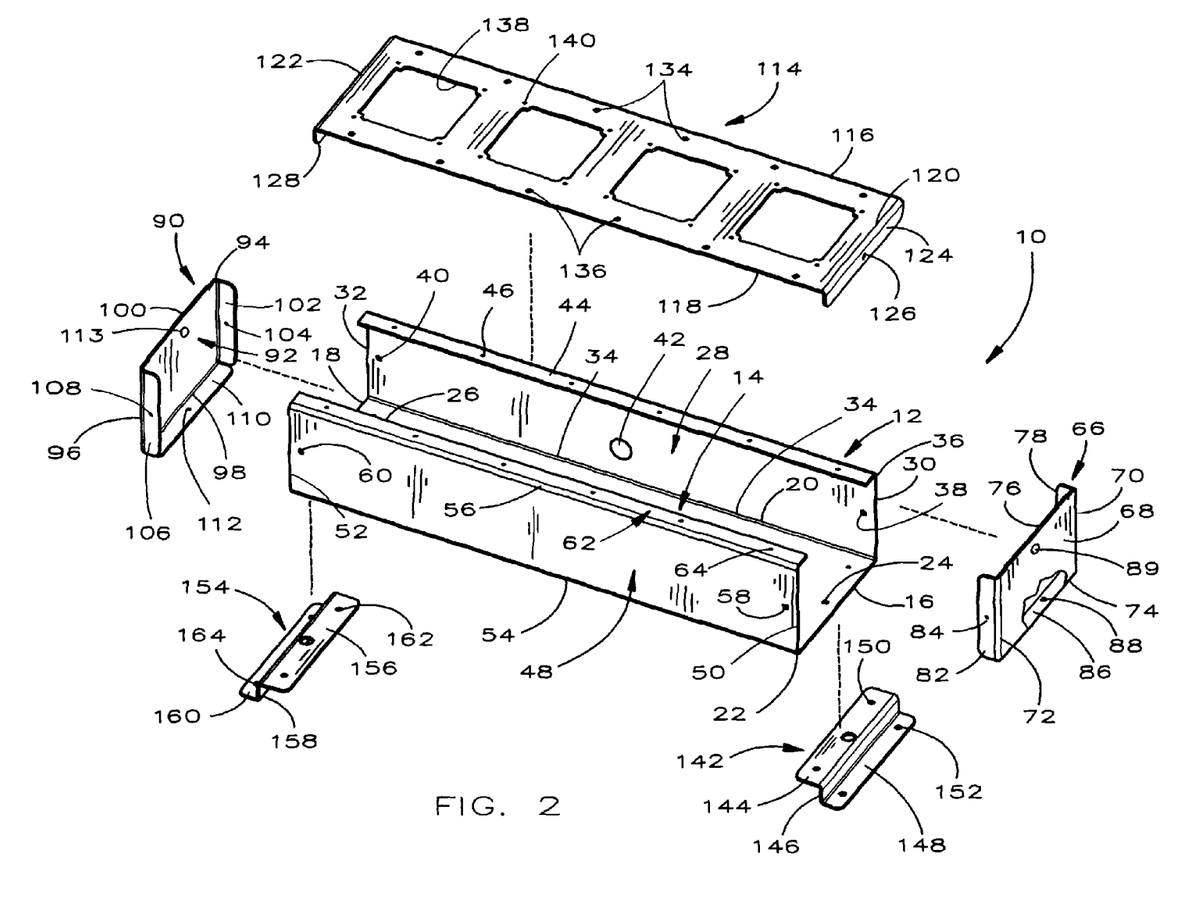
FIG. 2 is an exploded lower perspective view of the electrical gang box assembly of this invention.
Figure 3:
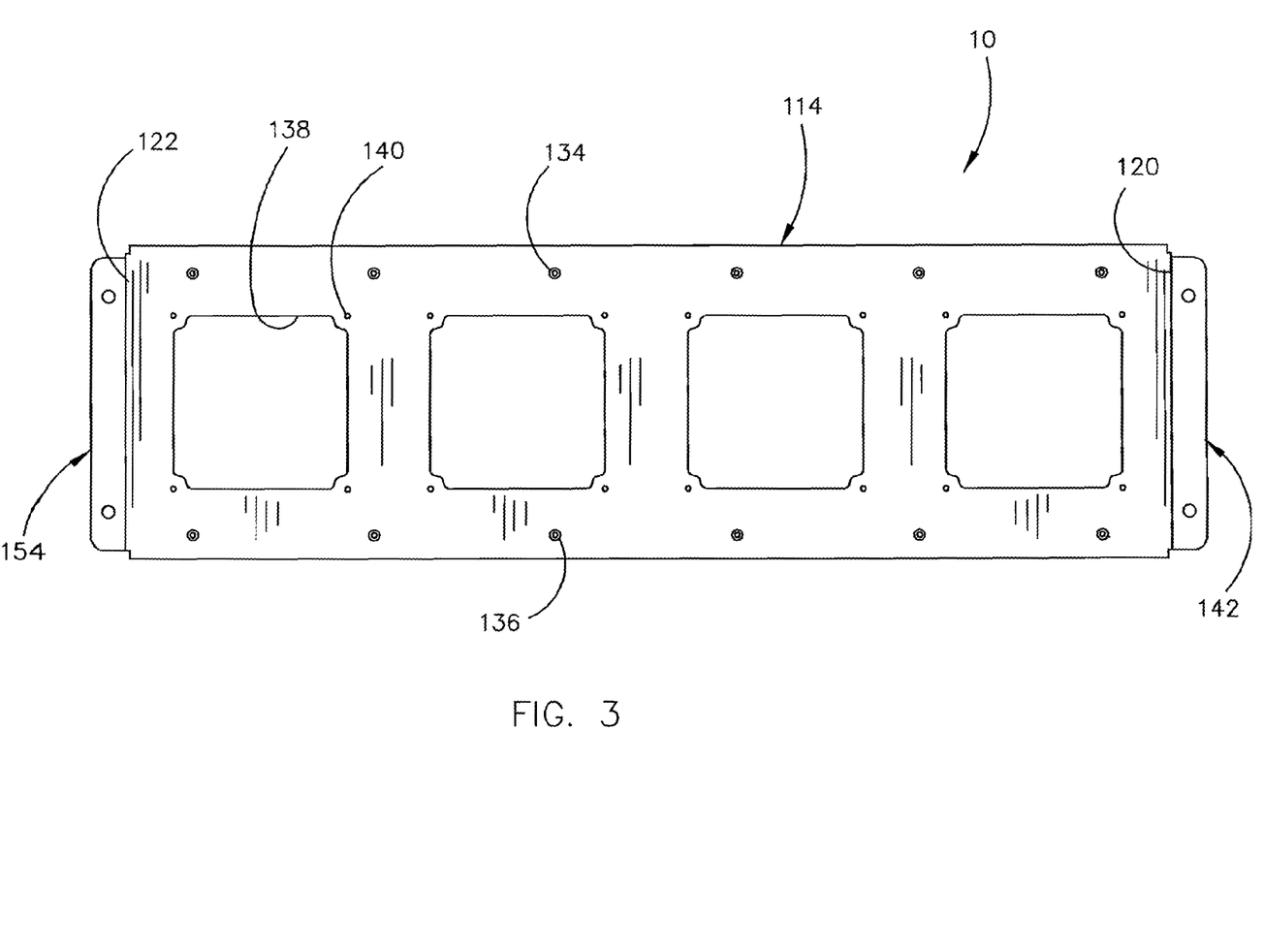
FIG. 3 is a front view of the electrical gang box assembly of this invention.
Figure 4:
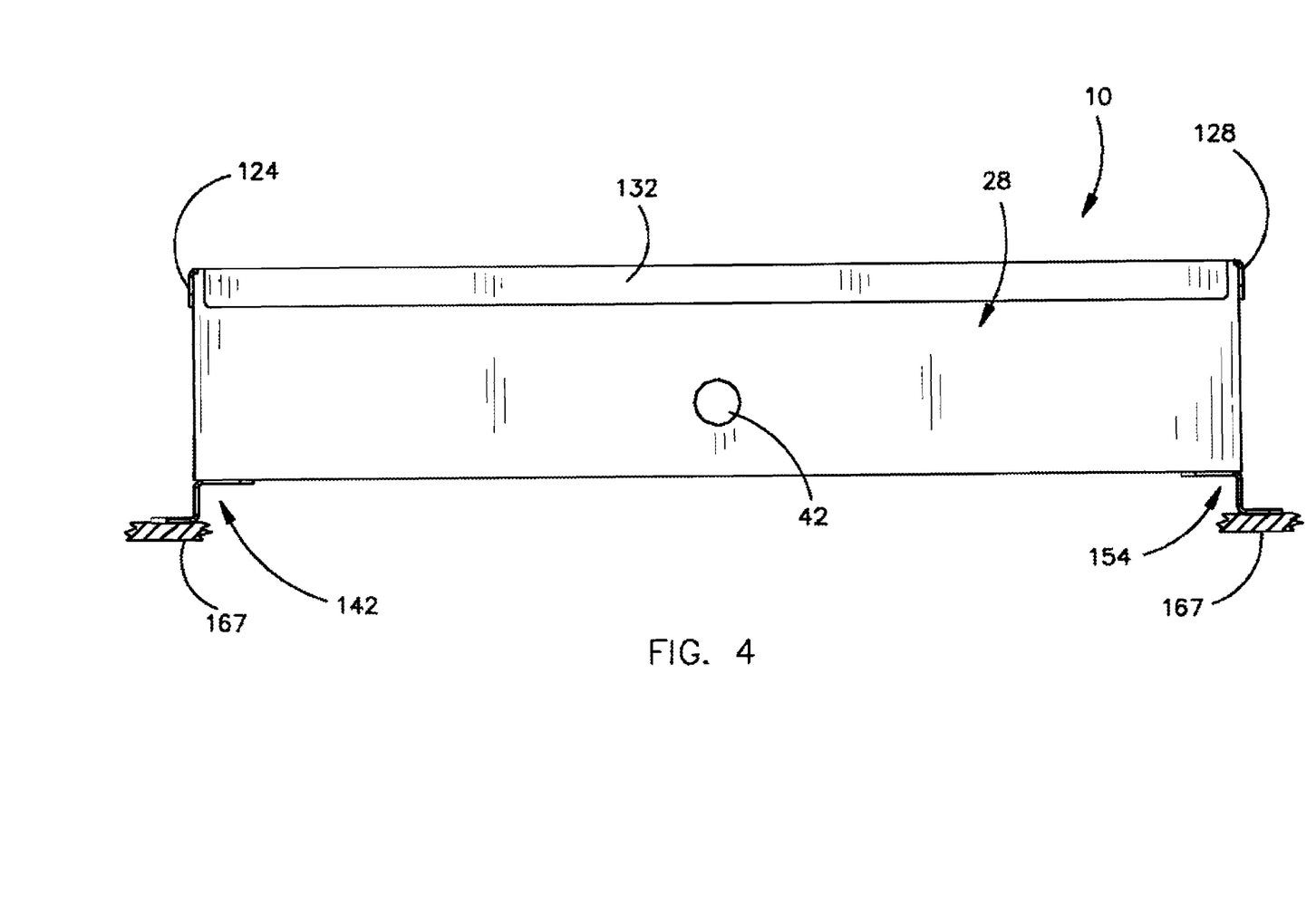
FIG. 4 is a top view of the electrical gang box assembly of this invention.
Figure 5:
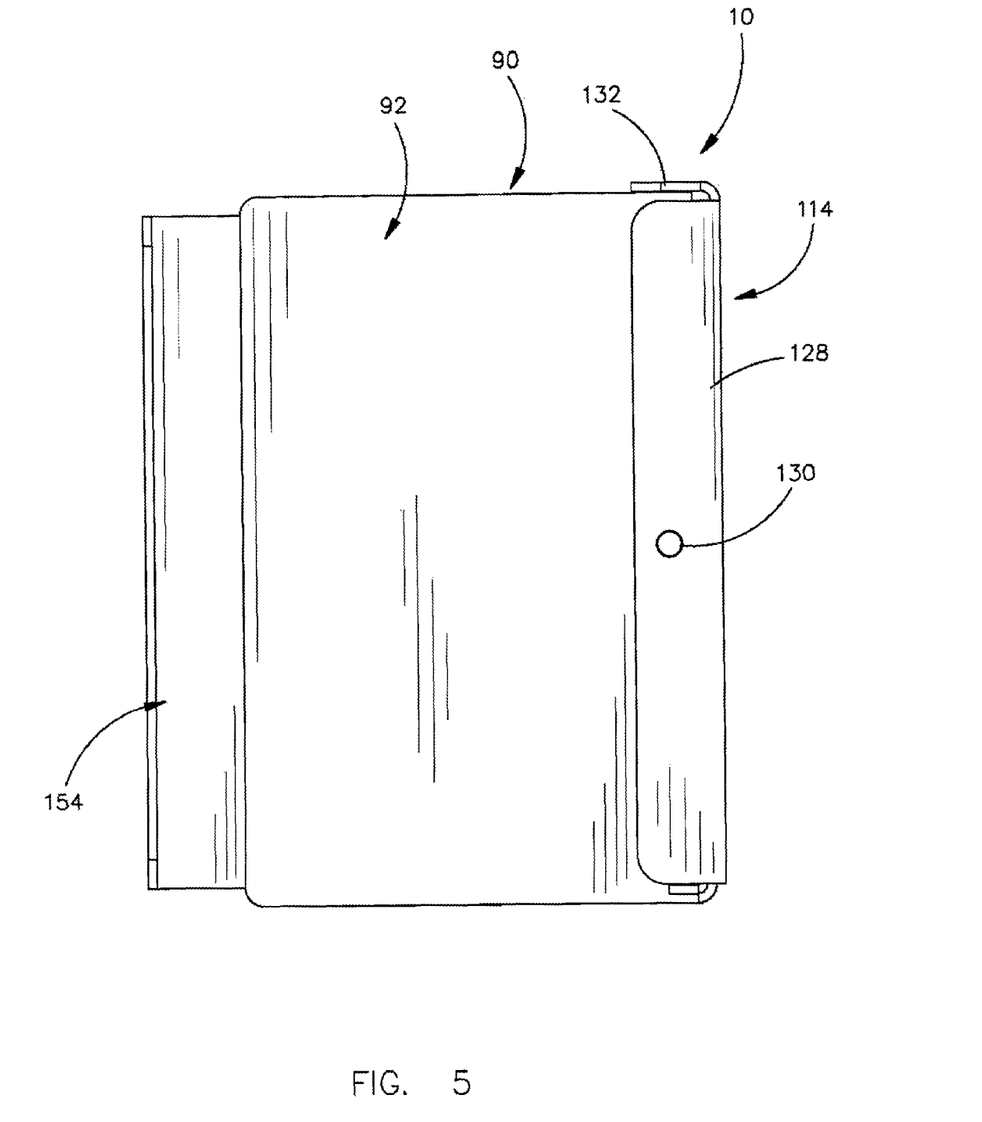
FIG. 5 is a side view of the second side of the electrical gang box assembly of this invention.
Figure 6A:
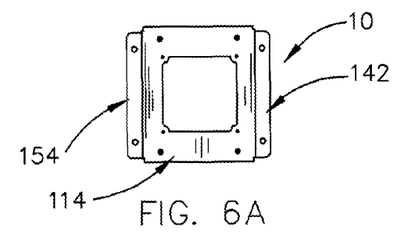
FIG. 6A is a front view of the electrical gang box assembly of this invention which has a single gang opening for mounting an electrical receptacle therein.
Figure 6B:
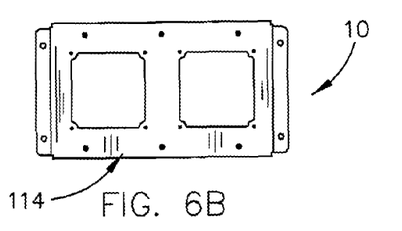
FIG. 6B is a front view of the electrical gang box assembly of this invention which has a pair of gang openings for mounting electrical receptacles therein.
Figure 6C:
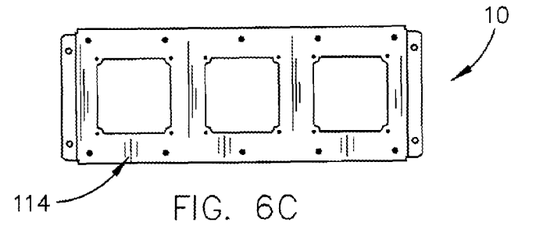
FIG. 6C is a front view of the electrical gang box assembly of this invention which has three gang openings for mounting electrical receptacles therein.
Figure 6D:
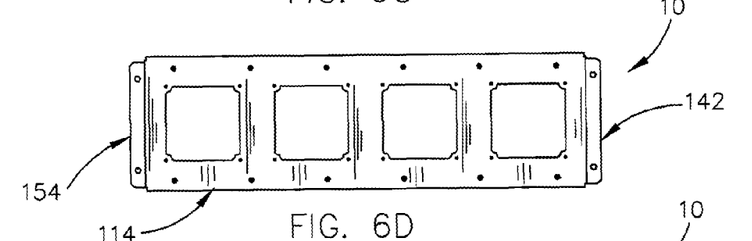
FIG. 6D is a front view of the electrical gang box assembly of this invention which has four gang openings for mounting electrical receptacles therein.
Figure 6E:
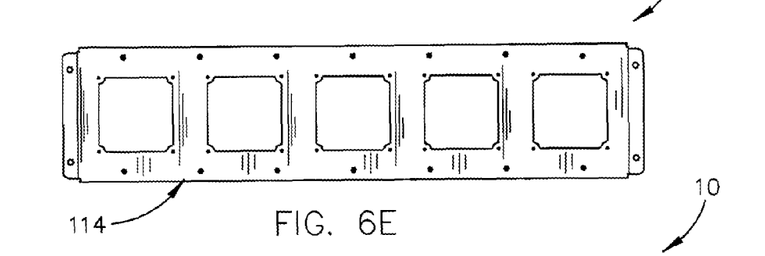
FIG. 6E is a front view of the electrical gang box assembly of this invention which has five gang openings for mounting electrical receptacles therein.
Figure 6F:
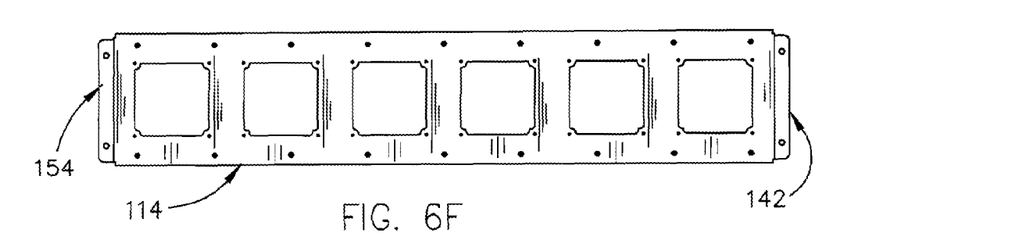
FIG. 6F is a front view of the electrical gang box assembly of this invention which has six gang openings for mounting electrical receptacles therein.
Figure 7:
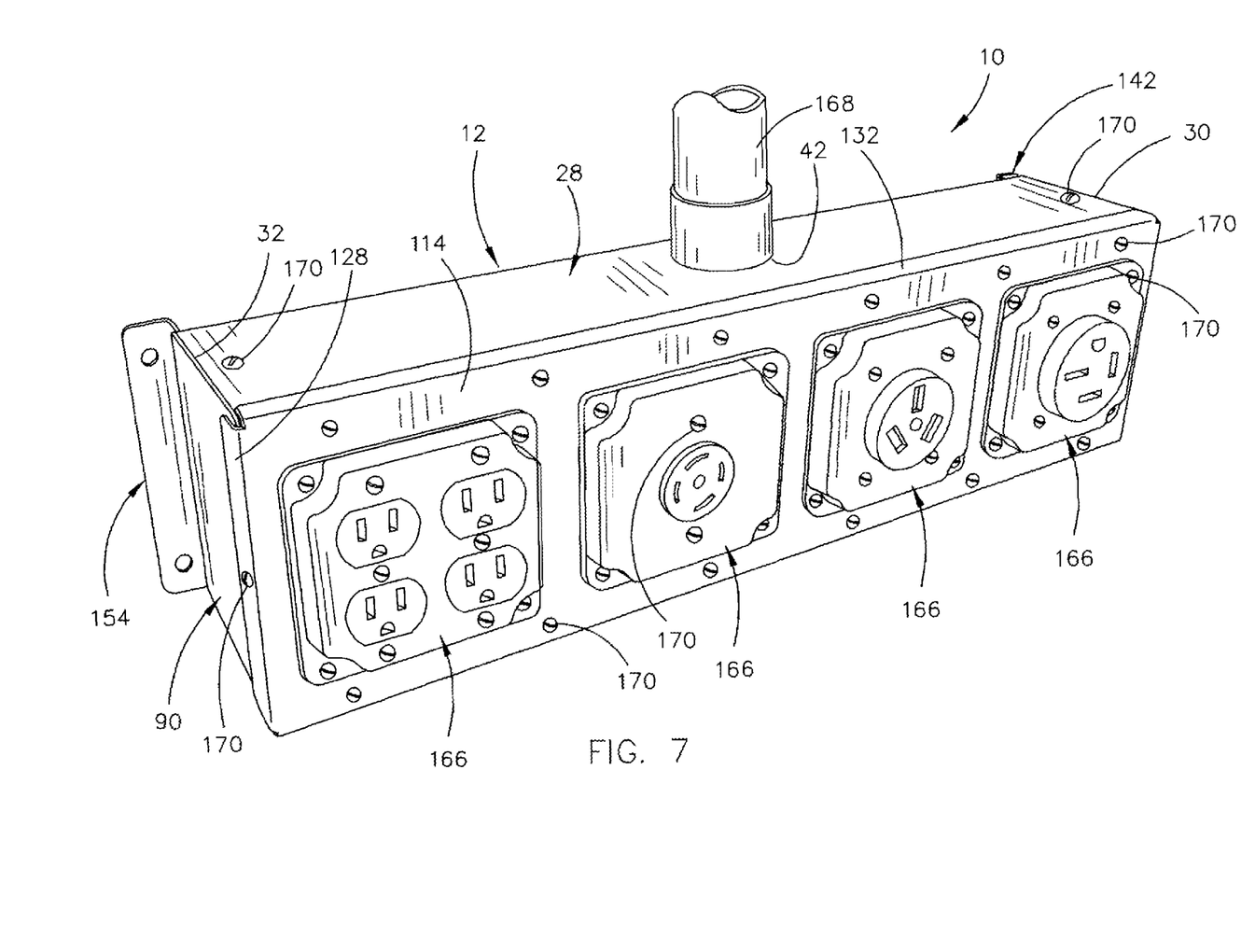
FIG. 7 is a front view of the electrical gang box assembly of FIG. 6D having electrical receptacles mounted in the gang openings thereof.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The present invention is directed to an electrical gang box assembly which is designed to support a plurality of electrical receptacles therein in a side-by-side and horizontally spaced-apart manner. The electrical gang box assembly 10 of thisinvention is horizontally disposed and includes an elongated support member 12 which is horizontally disposed.

Support member 12 includes a vertically disposed back wall 14 having a first end 16, a second end 18, an upper end 20 and a lower end 22. A plurality of vertically spaced-apart screw openings 24 are formed in back wall 14 inwardly of end 16 thereof. A plurality of vertically spaced-apart screw openings 26 are formed in back wall 14 inwardly of end 18 thereof. Support member 12 also includes a horizontally disposed top wall 28 which extends horizontally forwardly from the upper end 20 of back wall 14 and which has a first end 30, a second end 32, an inner or rearward end 34 and an outer or forward end 36. A screw opening 38 is formed in top wall 28 inwardly of end 30 thereof. A screw opening 40 is formed in top wall 28 inwardly of end 32 thereof. Top wall 28 has an opening 42 formed therein intermediate the length thereof designed to receive an electrical conduit 43 therein. An elongated flange 44 extends transversely downwardly from the forward end 36 of top wall 28 and has a plurality of horizontally spaced-apart screw openings 46 formed therein.

Support member 12 also includes a horizontally disposed bottom wall 48 which extends forwardly from the lower end 22 of back wall 14 and which has a first end 50, a second end 52, a rearward or inner end 54 and a forward or outer end 56. A screw opening 58 is formed in bottom wall 48 inwardly of end 50 of bottom wall 48. A screw opening 60 is formed in bottom wall 48 inwardly of end 52 of bottom wall 48. An elongated flange 62 extends transversely upwardly fromof front cover 114 and has a screw opening 130 formed therein. A flange 132 extends transversely rearwardly from the upper end 116 of front cover 114.

Front cover 114 has a plurality of horizontally spaced-apart screw openings 134 formed therein below the upper end 116 thereof and has a plurality of horizontally spaced-apart screw openings 136 formed therein above of the lower end 118 thereof. Front cover 114 has at least one generally square receptacle opening 138 formed therein. As seen, the front cover 114 may have a plurality of receptacle openings 138 formed therein. Front cover 114 has a plurality of screw openings 140 formed therein around each of the receptacle openings 138.

The numeral 142 an elongated and angular first back mount which has a front portion 144, an intermediate portion 146 and a back portion 148. Front portion 144 has a plurality of screw openings 150 formed therein and back portion 148 has a plurality of screw openings 152 formed therein.

The numeral 154 refers to an elongated and angular second back mount which has a front portion 156, an intermediate portion 158, and a back portion 160. Front portion 156 has a plurality of screw openings 162 formed therein and back portion 160 has a plurality of screw openings 164 formed therein. The numeral 166 refers to electrical receptacles which are positioned in openings 138. The numeral 170 refers to screws which are inserted into the various screw openings described above as will be explained hereinafter.

The electrical gang box assembly 10 of this invention is assembled as will now be described. If used, the back mounts 142 and 154 will be secured by screws or rivets to the first and second ends of back wall 14 respectively to enable the assembly 10 to be secured to a support wall 167. If the back mounts 142 and 154 are not used, the back wall 14 may be secured to the support wall 167 by screws 170 or the like. Regardless of how the back wall 14 is secured to the support wall, a conduit 168 is extended downwardly through opening 42 in top wall 28. Conduit 168 could be extended into the support member 12 through bottom wall 48 or through one of the side covers. Electrical wires are extended downwardly through conduit 168 into support member 12.

The first side cover 66 is secured to the first end of support member 12 whereby flange 78 is received below the first end 30 of top wall 28 and wherein flange 86 of side cover 66 is received forwardly of first end 16 of back wall 14 and wherein flange 82 is received above the first end of bottom wall 48. A screw 170 is extended through screw opening 38 in top wall 28 and through screw opening 80 in flange 78. A screw 170 is also extended through screw opening 24 in back wall 14 and through screw opening 88 in flange 86. A screw 170 is also extended through screw opening 58 in bottom wall 48 into screw opening 84 in flange 82 of side cover 68.

The second side cover 90 is secured to the second end of support member 12 whereby flange 102 is received below the second end 32 of top wall 28 and wherein flange 110 of side cover 90 is received forwardly of the second end 18 of back wall 14 and wherein flange 106 is received above the second end 52 of bottom wall 48. A screw 170 is extended through screw opening 40 in top wall 28 and through screw opening 104 in flange 102 of side cover 90. A screw 170 is extended through screw opening 26 in back wall 14 and through screw opening 112 inflange 110 of side cover 90. A screw 170 is extended through screw opening 60 in the second end of bottom wall 48 of support member 12 and through the screw opening 108 in flange 106 of side cover 90.

Prior to the front cover 114 being secured to the support member 12, receptacles 116 will be positioned in the receptacle openings 138 and secured thereto by screws 170 extending through the screw openings 140 and into the associated receptacle 116. The electrical wires may be then secured to the electrical receptacles 116. The cover 114 is then positioned at the forward end of support member 12 so that flange 132 is positioned over the forward end of the top wall 28. At that time, flange 124 of front cover 114 will extend rearwardly over the forward end of side cover 66 and flange 128 of front cover 114 will extend rearwardly over the forward end of side cover 90.

Screws 170 will then be extended through the screw openings 134 in front cover 114 into the screw openings 46 in upper flange 44 and screws 170 will be extended through the screw openings 136 in front cover 114 into the screw openings 64 in lower flange 62. A screw 170 is extended through screw opening 126 in flange 124 of front cover 114 into the screw opening 89 of side cover 66. A screw 170 is extended through screw opening 130 in flange 128 of front cover 114 into the screw opening 113 of side cover 90.

As seen, the box 10 may accommodate one or more electrical receptacles which may include sockets, switches, etc. If some of the receptacle openings 138 are not utilized, the spacing of the receptacle openings 138 permits the empty receptacle openings to be covered with a conventional cover. The box 10 of this invention is easy to assemble and is easily attached to a support wall 167. Further, the electrical receptacles are easily mounted in the box 10. Additionally, the box 10 is dust proof and weather proof.

Although the box has been described as having screw openings and screws, the openings could be rivet openings and the screws 170 could be rivets.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An electrical gang box assembly, comprising:
a horizontally disposed support member having a first end and a second end; said support member including:
  (a) a vertically disposed back wall having an upper end, a lower end, a first end and a second end;
  (b) a horizontally disposed top wall having a first end, a second end, a rearward end, and a forward end;
  (c) said top wall extending transversely forwardly from said upper end of said back wall;
  (d) a vertically disposed upper flange extending transversely downwardly from said forward end of said top wall;
  (e) a horizontally disposed bottom wall having a first end, a second end, a rearward end, and a forward end;
  (f) said bottom wall extending transversely forwardly from said lower end of said back wall;
  (g) a vertically disposed lower flange extending transversely upwardly from said forward end of said bottom wall;
a vertically disposed first side cover having an upper end, a lower end, a forward end, and a rearward end;
said first side cover being selectively removably secured to said support member;
said first side cover having a horizontally disposed first flange which extends transversely inwardly from said upper end of said first side cover, a vertically disposed second flange which extends transversely inwardly from said rearward end of said first side cover, and a horizontally disposed third flange which extends transversely inwardly from said lower end of said first side cover;
said first side cover being positioned at said first end of said support member to close said first end of said support member;
said first flange of said first side cover being positioned beneath said first end of said top wall of said support member;
said second flange of said first side cover being positioned forwardly of said first end of said back wall of said support member;
said third flange of said first side cover being positioned above said first end of said bottom wall of said support member;
said first side cover being selectively removably secured to said support member;
a vertically disposed second side cover having an upper end, a lower end, a forward end, and a rearward end;
said second side cover being selectively removably secured to said support member;
said second side cover having a horizontally disposed first flange which extends transversely inwardly from said upper end of said second side cover, a vertically disposed second flange which extends transversely inwardly from said rearward end of said second side cover, and a horizontally disposed third flange which extends transversely inwardly from said lower end of said second side cover;
said second side cover being positioned at said second end of said support member to close said second end of said support member;
said first flange of said second side cover being positioned beneath said second end of said top wall of said support member;
said second flange of said second side cover being positioned forwardly of said second end of said back wall of said support member;
said third flange of said second side cover being positioned above said second end of said bottom wall of support member;
a vertically disposed front cover having a first end, a second end, an upper end, a lower end, a rearward side and a forward side;
said front cover having a first flange which extends transversely rearwardly from said first end of said front cover;
said front cover having a second flange which extends transversely rearwardly from said second end of said front cover;
said front cover having a third flange which extends transversely rearwardly from said upper end of said front cover;
said front cover being positioned relative to said support member so that:
  (a) said third flange of said front cover is positioned above said forward end of said top wall of said support member and is in engagement therewith;
  (b) said upper end of said front cover is in engagement with said upper flange of said top wall of said support member;
  (c) said lower end of said front cover is in engagement with said lower flange of said bottom wall of said support member;
  (d) said first flange of said front cover embraces said forward end of said first side cover; and
  (e) said second flange of said front cover embraces said forward end of said second side cover;
said upper end of said front cover being secured to said top wall of said support member;
said first end of said front cover being secured to said first side cover;
said second end of said front cover being secured to said second side cover; and
said front cover having at least one electrical receptacle opening formed therein which is configured to have an electrical receptacle positioned therein.

* * * * *